UNITED STATES PATENT OFFICE.

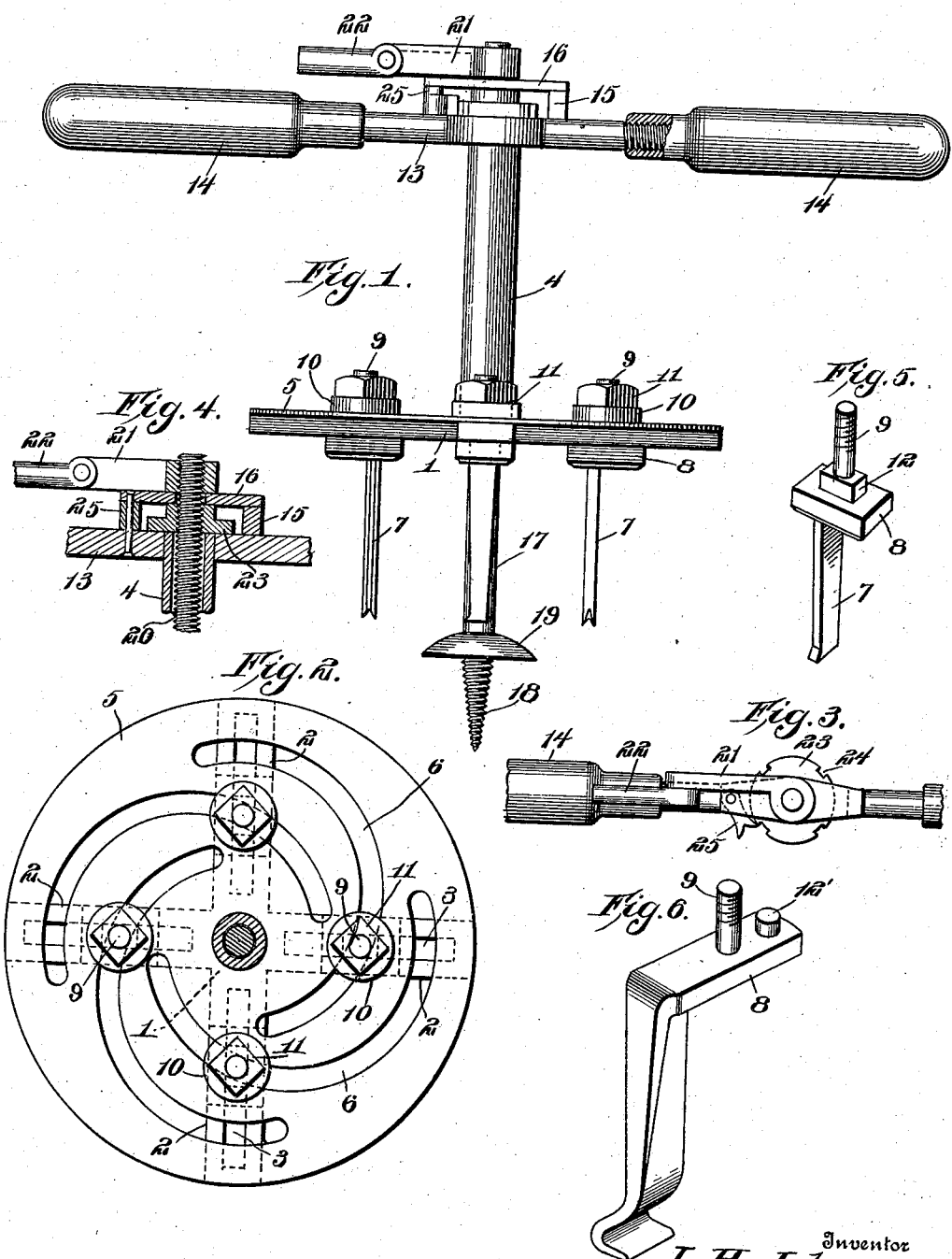

JOHN H. JOHNSON, OF WINNIPEG JUNCTION, MINNESOTA.

BORING-TOOL.

No. 858,293.  Specification of Letters Patent.  Patented June 25, 1907.

Application filed July 18, 1906. Serial No. 326,755.

*To all whom it may concern:*

Be it known that I, JOHN H. JOHNSON, a citizen of the United States of America, residing at Winnipeg Junction, in the county of Clay and State of Minnesota, have invented new and useful Improvements in Boring-Tools, of which the following is a specification.

This invention relates to improvements in boring and cutting tools, and is especially designed as an improvement in the class of tools adapted for boring bung holes and spoke sockets, although it may be efficiently used for other analogous purposes.

One object of the invention is to provide a boring tool having a series of bits or cutters which are readily and easily adjustable in a novel manner for boring holes or sockets of varying diameters, and which is simple of construction and adapted to be easily and conveniently operated.

Another object is to provide a tool of this character having improved means for centering the tool in action and permitting of a ready adjustment thereof for boring holes and sockets of different depths.

In the accompanying drawings,—Figure 1 is a view in elevation of a boring tool embodying my invention. Fig. 2 is a plan view thereof, omitting the operating handles and associated parts. Fig. 3 is a plan view, showing the means for independently turning the feed screw and operatively connecting the cutter head therewith. Fig. 4 is a vertical section through a portion of the tool. Figs. 5 and 6 are views of different forms of bits or cutting tools.

Referring to the drawings, the numeral 1 designates a cutter head comprising a plurality of integrally connected radial arms 2, each provided with a longitudinal slot 3. Fixed to the center of the cutter head and extending upwardly therefrom is a tubular shank 4, on which rotates an adjusting disk 5 provided with a plurality of cam slots 6 equal in number to the slots 3 in the radial arms. The arms 2 carry cutters 7, which may be of any preferred form to suit the specific character of work to be done, each cutter being provided with a head 8 to bear against the underside of the arm to which it is applied, from which head extends a threaded stem 9 adapted to project upwardly through the coöperating slots 3 and 6 and to receive a washer 10 and nut 11 for clamping the cutter and adjusting disk in adjusted position. The cutter is further provided with a guiding member or portion 12 which travels in the slot 3 and holds the cutter from axial play or rotation.

In Fig. 5 I have shown one form of cutter for ordinary boring work, such as can be conveniently used in the cutting of boring holes, and in Fig. 6 a modified form of cutter designed to be employed in the formation of spoke sockets. It will be observed that the form of tool disclosed in Fig. 6 embodies a different form and arrangement of cutting edge and has its abutting head 8 projecting laterally from one side thereof and its guiding projection 12' formed upon the head but independent of the screw stem 9 and preferably in the contour of a circular boss or stud.

I do not limit the invention to any particular type of cutting tool, except in those claims wherein the specific means for connecting the tool to the cutter head and adjusting disk are specifically set forth.

It will be observed that upon relaxing the nuts and turning the disk 5 in one direction or the other the cutters will be adjusted in and out or radially toward and from the center of the head to position them for cutting sockets or openings varying in diameter to a material extent. A handle bar 13 is fixed to the upper end of the tubular shank 4 and is threaded at its ends for engagement with the screw socketed inner ends of handles or grips 14, which are thus adjustably related so that the handle bar may be varied in length to enable the applied power or leverage to be varied. Supports 15 rise from the handle bar on opposite sides of the upper projecting end of the shank 4 and support a yoke or cross bar 16. A centering stem or spindle 17 extends upwardly through the head, shank and cross bar and is normally free to turn independent thereof. The lower end of this spindle terminates in a fastening screw 18 adapted to be forced into the work or body to be bored to rigidly fasten the spindle thereto, and above said screw the spindle is provided with the usual stop or abutment shoulder 19 to bear upon the surface of the work when the screw is fully inserted.

The upper end of the spindle 17 is threaded, as shown at 20, to form a feed screw, and has fixed thereto above the bar or yoke 16 an operating crank 21 provided with a pivoted holding handle 22. By means of this crank handle the spindle may be rotated independently of the cutter head to speedily insert the screw 18 into the work and withdraw it therefrom at the completion of the boring operation. A nut 23 engages the threaded portion of the spindle between the handle and yoke or cross bar 16 and comprises a circular disk provided in its outer edge with a plurality of notches 24 adapted to be engaged by a pawl 25 pivotally mounted upon one of the supports 15. This pawl and nut form a clutch connection for locking the handle and nut against relative movement, thus coupling the nut to the cutter head so that when the handle is turned the cutter head through the nut will travel on the feed screw 20. The pawl is provided with oppositely projecting teeth and is adapted to be swung on either side of its pivotal connection to couple the cutter head to the nut for up or down travel on the screw. By first fixing the nut to the cutter head and handle by engaging the pawl therewith, the cutter head may be adjusted up or down on the spindle to properly position the same relative to the bearing face of the shoulder 19 to form a socket or opening of the desired depth, after which by releasing the pawl the spindle may be independently rotated without varying the arrangement of the parts to force the screw 18 into the work, thus fixing the spindle against rotation to serve as a support for the cutter head. Upon then again connecting the pawl with the nut and turning the handle bar 13 the cutter head will travel downward on the screw, thus feeding the cutters forward to their work.

The mode of removing the device after the bore or opening has been formed will be readily understood from the foregoing description, and the advantages of my improved structure will be apparent to those versed in the art.

Having thus described the invention, what is claimed as new, is:—

1. In a tool of the character described, the combination of a cutter head, a tubular shank extending upwardly therefrom, an operating handle applied to the shank, a spindle journaled in the shank and provided with a fastening screw at its lower end and having feed threads, means for adjusting the spindle, a nut engaging the feed threads, and a pawl on the handle for locking said nut against rotation.

2. In a tool of the class described, the combination of a cutter head, a tubular shank extending upwardly therefrom, a spindle journaled in the shank and having a fastening screw at its lower end and provided above the same with feed threads, a nut held from longitudinal movement on the shank and engaging said feed threads, a handle on the shank, means carried by the handle to lock the nut thereto, radially adjustable cutters on the cutter head, and means for adjusting said cutters.

3. In a tool of the class described, the combination of a cutter head having a tubular shank extending upwardly therefrom, a spindle extending through and journaled in the shank and having a fastening screw at its lower end and feed threads at its upper end, a handle fixed to the upper end of the tubular shank, a yoke carried by the handle, a nut arranged within the yoke and engaging the feed threads, said nut being provided with rack teeth, a pawl pivotally mounted upon the yoke to engage said teeth, and an operating handle connected with the upper end of the stem.

4. In a tool of the class described, the combination of a cutter head having a tubular shank extending upwardly therefrom, a spindle extending through and journaled in the shank and having a fastening screw at its lower end and feed threads at its upper end, a cutter operating handle applied to the shank, an operating device applied to the upper end of the spindle, a nut held from longitudinal movement on the shank and engaging said feed threads, said nut being provided with peripheral teeth, and a pawl pivotally mounted upon the handle and adapted to engage the teeth to lock the nut against rotation, said pawl being reversible to lock the nut against rotation in either direction.

In testimony whereof, I affix my signature in presence of two witnesses.

JOHN H. JOHNSON.

Witnesses:
W. GEO. HAMMETT,
A. L. JELSING.